(12) United States Patent
Kikuchi (10) Patent No.: US 6,370,787 B1
(45) Date of Patent: *Apr. 16, 2002

(54) MEASURING MACHINE (75) Inventor: Shigeo Kikuchi, Utsunomiya (JP)

(73) Assignee: Mitutoyo Corporation, Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/348,286

(22) Filed: Jul. 7, 1999

(30) Foreign Application Priority Data

Jul. 13, 1998 (JP) ............................................ 10-197327

(51) Int. Cl.$^7$ .......................... G01B 7/28; G01B 5/008; G01B 5/03
(52) U.S. Cl. ............................. 33/503; 33/504; 33/505; 33/506; 33/1 M
(58) Field of Search .......................... 33/503, 504, 505, 33/549, 555, 556, 1 M, 702, 704, DIG. 2

(56) References Cited

U.S. PATENT DOCUMENTS

| | | | |
|---|---|---|---|
| 4,610,089 A | * 9/1986 | Bell et al. ..................... 33/1 M |
| 4,631,834 A | * 12/1986 | Hayashi et al. ................ 33/503 |
| 5,189,806 A | * 3/1993 | McMurtry et al. ............. 33/503 |
| 5,408,754 A | * 4/1995 | Raab ............................. 33/503 |
| 5,778,548 A | * 7/1998 | Cerruti ......................... 33/504 |
| 5,848,477 A | * 12/1998 | Wiedmann et al. ............ 33/503 |
| 5,890,300 A | * 4/1999 | Brenner et al. ................ 33/503 |
| 5,926,782 A | * 7/1999 | Raab ............................. 33/504 |
| 6,044,569 A | * 4/2000 | Ogihara et al. ................ 33/556 |
| 6,058,618 A | * 5/2000 | Hemmelgarn et al. ......... 33/503 |

* cited by examiner

*Primary Examiner*—Diego Gutierrez
*Assistant Examiner*—Yaritza Guadalupe
(74) *Attorney, Agent, or Firm*—Oliff & Berridge, PLC (57) ABSTRACT

A measuring machine having a base (10), a touch signal probe (P), a moving mechanism (20) for retaining the touch signal probe (P) movably in three-dimensional directions, and a controller (60) for controlling a movement of the moving mechanism (20) and for acquiring coordinates value of respective axes based on a contact signal from the touch signal probe (P) to measure a dimension etc. of a workpiece based on the coordinates value is provided. Main structural members structuring the moving mechanism (20), more specifically, a column (21), a supporter (22), a X-beam (23), a Z-axis structure (25) and a Z-axis spindle (26) are made of aluminum or aluminum alloy including aluminum as main component, which has large thermal conductivity, thereby making temperature distribution uniform to improve geometrical accuracy.

6 Claims, 12 Drawing Sheets

MEASURING MACHINE

BACKGROUND OF THE INVENTION

1. Field of the Invention

The present invention relates to a measuring machine such as a three-dimensional measuring machine and coordinates measuring machine. More specifically, it relates to a measuring machine having a base, a probe and a moving mechanism for relatively moving the base and the probe, in which accuracy with respect to temperature change is guaranteed, and furthermore, a accuracy-guaranteed temperature range can be extended.

2. Description of Related Art

Conventionally, a measuring machine such as three-dimensional measuring machine and coordinates measuring machine has been known for measuring profile and dimension of a workpiece. Generally, such measuring machine has a base, a probe, a moving mechanism for moving the probe relative to the base in three-dimensional directions (X, Y and Z-axis directions), and a controller for; controlling the movement of the moving mechanism; for acquiring coordinate value of respective axes when the probe contacts the workpiece and; for measuring the dimension of the workpiece based on the coordinate values.

Usually, main structural members such as the base and the moving mechanism of this type of measuring machine are made of materials having rigidity required for the respective components.

For instance, the base is made of stone, ceramics and castings and has a covering member for covering the circumference thereof. Both leg portions of a portal frame of the moving mechanism is made of castings, and beam spanning between upper ends of the legs is made of ceramics, the combination of the parts constituting the moving mechanism.

However, since the conventional measuring machine uses different material having rigidity required for respective portions, geometrical accuracy in temperature change is deteriorated.

The deterioration in the geometrical accuracy is thought to be caused by following reasons:

(1) Deterioration in geometrical accuracy according to difference in temperature distribution inside the machine Since the conventional measuring machine uses different material having rigidity required for respective portions, thermal conductivity differs in respective portions, thereby making the temperature distribution inside the machine uneven to deteriorate geometrical accuracy.

(2) Deterioration in geometrical accuracy by attaching difference members

Since members having different thermal expansion coefficient are directly attached in respective portions of the conventional measuring machine, the expansion amount of respective members differ when the temperature changes, thereby causing the deterioration of the geometrical accuracy.

Some of the three-dimensional measuring machines have temperature correcting function, which try to expand the range of temperature in which the accuracy is guaranteed.

However, the temperature correcting function can not effectively performed as long as the aforesaid problem (deterioration of geometrical accuracy in temperature change) is not solved.

SUMMARY OF THE INVENTION

The object of the present invention is to provide a measuring machine for guaranteeing the geometrical accuracy in temperature change, thereby guaranteeing the accuracy in temperature accuracy and extending the range of temperature in which the accuracy is guaranteed.

A measuring machine according to the present invention has a base, a probe and a moving mechanism for relatively moving the base and the probe. The measuring machine is characterized in that a main structural member of the moving mechanism is made of aluminum or aluminum alloy including aluminum as main component.

According to the above arrangement, since the main structural member of the moving mechanism is made of aluminum or aluminum alloy including aluminum as main component, which have large thermal conductivity, temperature tracking ability against the temperature change can be improved, thereby making uniform temperature distribution of the entire machine.

For instance, when the moving mechanism is made of a portal frame, a slider and a Z-axis spindle, the portal frame, the slider and the Z-axis spindle may be made of aluminum or aluminum alloy including aluminum as main component to make temperature distribution of the main structural member of the moving mechanism to be uniform.

Accordingly, since the deterioration in geometrical accuracy in accordance with the temperature change can be restrained, the accuracy can be guaranteed irrespective of the temperature change and the accuracy-guaranteed temperature range can be extended.

In the above, the moving mechanism preferably has first moving mechanism for linearly moving the probe, second moving mechanism for moving the probe in a direction orthogonal with the moving direction of the first moving mechanism, and third moving mechanism for moving the probe in a direction orthogonal with the moving direction of the first moving mechanism and the second moving mechanism.

Accordingly, the probe can be moved in three-dimensional directions, thereby highly accurately measuring three-dimensional dimension of the workpiece.

Further, at least one of the first, the second and the third moving mechanism preferably has a guide member fixed along the moving direction thereof, a slider movably provided to the guide member, a feed screw axis disposed to the guide member along the moving direction of the slider and having both ends being fixed to the guide member, and a nut member screwed to the feed screw axis for moving the slider in a longitudinal direction of the feed screw axis by a rotation of the feed screw axis, the guide member being formed of aluminum or aluminum alloy having aluminum as main component, and the feed screw axis being formed of steel and having an end portion supported to be slidable in an axial direction thereof.

According to the above arrangement, since the feed screw axis can be slid in the axial direction thereof even when the guide member and the feed screw causes difference in expansion amount in accordance with the temperature change, the disadvantage caused by the difference of the thermal expansion rate of the guide member and the feed screw axis can be eliminated.

Further, since the guide member is formed of aluminum or aluminum alloy having aluminum as main component, the temperature distribution of the main structural member of the moving mechanism can be made uniform. On the other hand, since the feed screw axis is formed of steel having large rigidity, the slide accuracy of the slider can be secured.

When a member attached to the main structural member of the moving mechanism is made of a material other than aluminum or aluminum alloy having aluminum as main component, an elastic member is preferably inserted to the attachment portion of the main structural member and the member attached thereto.

Accordingly, even when the main structural member and the member attached thereto cause difference in expansion amount in accordance with the temperature change, the difference can be absorbed by the elastic deformation of the elastic member, thereby solving the disadvantage caused by the difference in thermal expansion rate between the main structural member and the member attached thereto.

Further, when the member attached to the main structural member of the moving mechanism is made of a material other than aluminum and aluminum alloy including aluminum as main component, the member attached to the main structural member of the moving mechanism preferably has an easily elastically deforming portion.

Also in the above, even when the main structural member and the member attached thereto cause difference in expansion amount in accordance with the temperature change, the difference can also be absorbed by the elastic deformation of the elastic member, thereby solving the disadvantage caused by the difference in thermal expansion rate between the main structural member and the member attached thereto.

Another measuring machine according to the present invention has a base, a probe and a moving mechanism for relatively moving the base and the probe, the base having a cover for covering the periphery thereof and a fan for circulating air to an inside and an outside of the cover.

Accordingly, since the temperature distribution inside the cover for covering the base can be made uniform by the fan, the geometrical accuracy in temperature change can be guaranteed.

Still another measuring machine according to the present invention has a base, a probe, a moving mechanism for moving the probe relative to the base, and a controller for controlling the movement of the moving mechanism. The measuring machine is characterized in having a thermal insulating cover for covering the controller and a fan for discharging waste heat from the controller to an outside thereof.

According to the above, since the heat from the controller can be discharged to the outside by the fan, the bad influence by the heat can be restrained to the utmost, thereby also guaranteeing geometrical accuracy in temperature change.

DETAILED DESCRIPTION OF PREFERRED EMBODIMENT(S)

An embodiment in which a measuring machine according to the present invention is applied to a three-dimensional measuring machine will be described below.

[General Arrangement]

Figure 1:
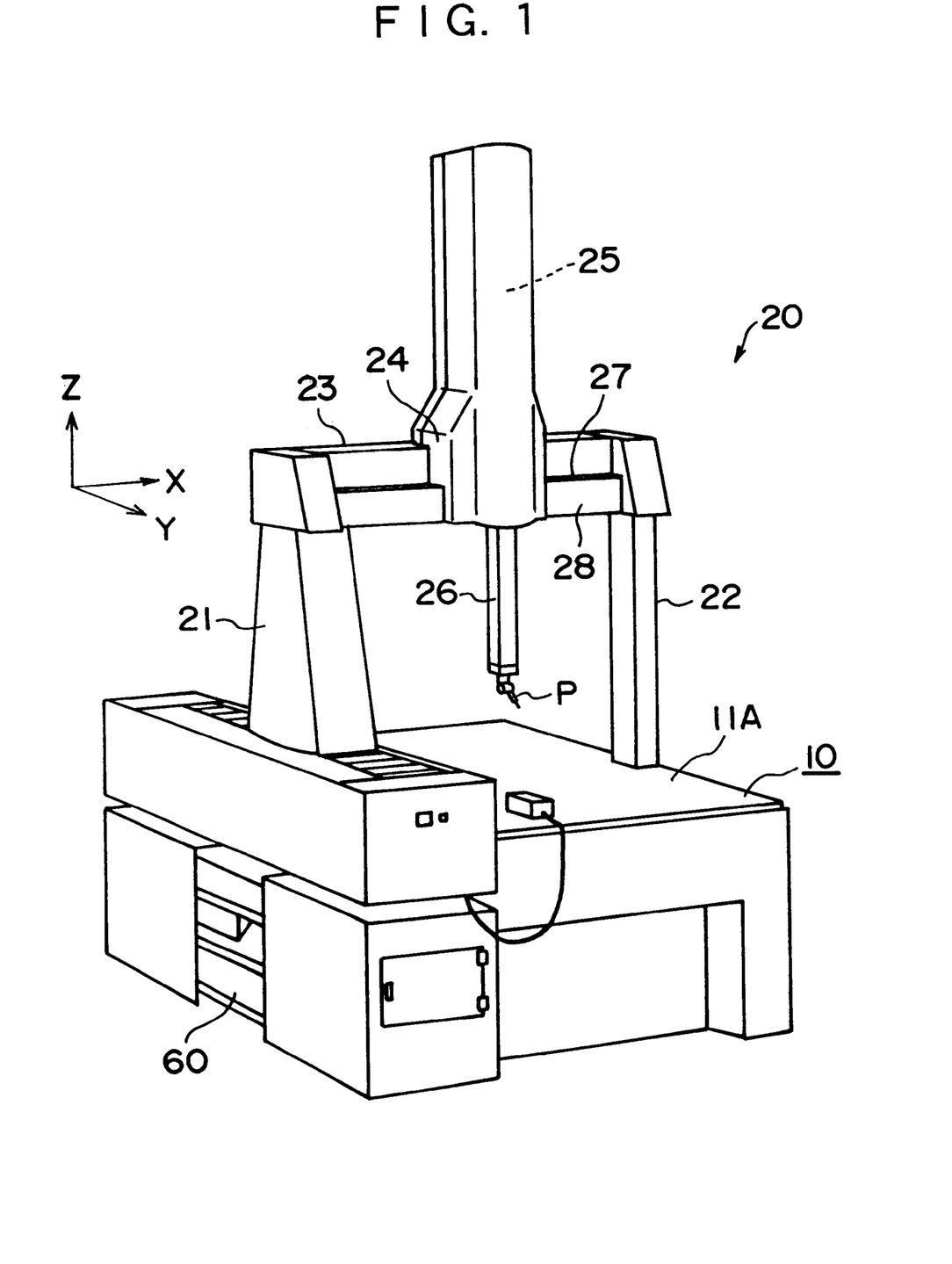
FIG. 1 is a perspective view showing a three-dimensional measuring machine according to an embodiment of the present invention.

As shown in FIG. 1, the three-dimensional measuring machine according to the present invention has a base 10, a touch signal probe P as a probe, a moving mechanism 20 for moving the touch signal probe P in three-dimensional directions (X, Y and Z-axis directions) relative to the base 10, and a controller 60 for controlling the movement of the moving mechanism 20 and for acquiring coordinates values of respective axes (X, Y and Z-axis) when the touch signal probe P contacts a workpiece to measure a dimension etc. of the workpiece based on the coordinates values.

The moving mechanism 20 has a column 21 and a supporter 22 disposed on both sides of the base 10 movably in back and forward direction (Y-axis direction), a X-beam 23 spanning over upper ends of the column 21 and the supporter 22, a slider 24 disposed along the X-beam 23 movably in right and left directions (X axis direction), and a Z-axis spindle 26 elevatably disposed on the slider 24 through a Z-axis structure 25.

The column 21, the supporter 22 and the X-beam 23 constitutes a Y-axis moving mechanism as first axis moving mechanism for moving the touch signal probe P in Y-axis direction, the slider 24 constitutes a X axis moving mechanism as second axis moving mechanism for moving the touch signal probe P in X-axis direction orthogonal with the Y-axis direction, and the Z-axis structure 25 and the Z-axis spindle 26 constitutes a Z-axis moving mechanism as third moving mechanism for moving the touch signal probe P in Z-axis direction orthogonal with the Y-axis and the X-axis directions.

[Measure Against Temperature in X, Y and Z-axis Moving Mechanism]

In the present embodiment, the main structural material of the X, Y and Z axis moving mechanism constituting the moving mechanism 20 is made of aluminum or aluminum alloy having aluminum as main component, which has large thermal conductivity. More specifically, the column 21, the supporter 22 and the X-beam 23 constituting the Y-axis moving mechanism, the slider 24 constituting the X-axis moving mechanism, and the Z-axis structure 25 and the Z-axis spindle 26 constituting the Z-axis moving mechanism is made of aluminum or aluminum alloy having aluminum as main component, which have large thermal conductivity.

Accordingly, since the material of the main structure constituting the moving mechanism is made of aluminum or aluminum alloy having aluminum as main component, the temperature tracking ability against the temperature change can be improved, and consequently, the temperature distribution can be made uniform. Therefore, the geometrical accuracy in accordance with temperature change can be prevented from deterioration. Incidentally, the member made of aluminum or aluminum alloy having aluminum as main component, is not limited to the aforesaid specific structural member. It is preferable that all of the structural member except for portions required to be made of material other than aluminum or aluminum alloy having aluminum as main component should be made of the same material (aluminum or aluminum alloy having aluminum as main component).

Further, the present embodiment has a displacement sensor (composed of a scale and detector) for detecting the movement position (coordinates value) of respective axis moving mechanism, and a scale attachment plate (member for fixing the scale) for fixing the scale to main structural material of respective axes is made of the same material (aluminum or aluminum alloy having aluminum as main component). For instance, as shown in FIG. 1, the displacement sensor for detecting the coordinate position in X-axis direction has the X-beam 23 and a scale attachment plate 27 (a member for fixing a scale 28) which are made of the same material (aluminum or aluminum alloy having aluminum as main component).

[Measure Against Temperature in Driving System of X, Y and Z-axis Moving Mechanism]

Figure 2:
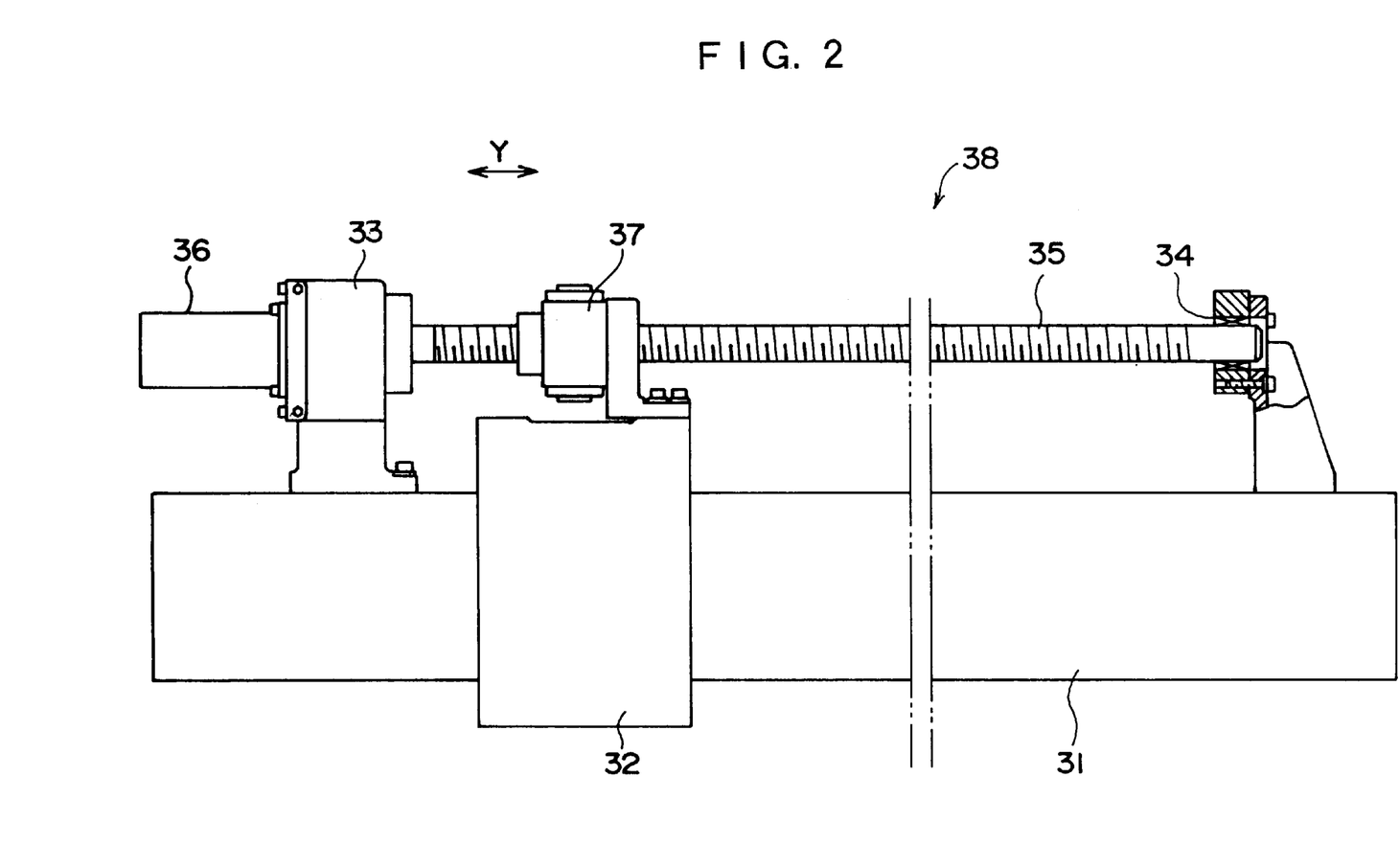
FIG. 2 is an illustration of a driving system of an Y-axis moving mechanism according to the aforesaid embodiment.

The X, Y and Z-axis moving mechanism has a driving system for moving respective movable members. For instance, as shown in FIG. 2, the Y-axis moving mechanism has a guide member 31 fixed along a moving direction thereof (Y-axis direction), a slider 32 movably disposed to the guide member 31, a ball screw axis 35 as a feed screw axis disposed on the guide member 31 along the moving direction of the slider 32 and having both ends being retained by the guide member 31 through the bearing 33 and 34, a driving source 36 for rotating the ball screw axis 35, and a driving system 38 screwed to the ball screw axis 35, fixed to the slider 32 and composed of a nut member 37 for moving the slider 32 in a longitudinal direction of the feed screw axis 35 while moving by the rotation of the ball screw axis 35.

The guide member 31 is made of aluminum or aluminum alloy having aluminum as main component, which has large thermal conductivity. The ball screw axis 35 is formed of steel having high rigidity. In other words, the guide member 31 and the ball screw axis 35 are made of material having different thermal expansion rate. When materials having different thermal expansion rate are mutually attached, since expansion amount of the material in accordance with temperature change differ, there is a problem of flexure caused on either one of the members.

Figure 3:
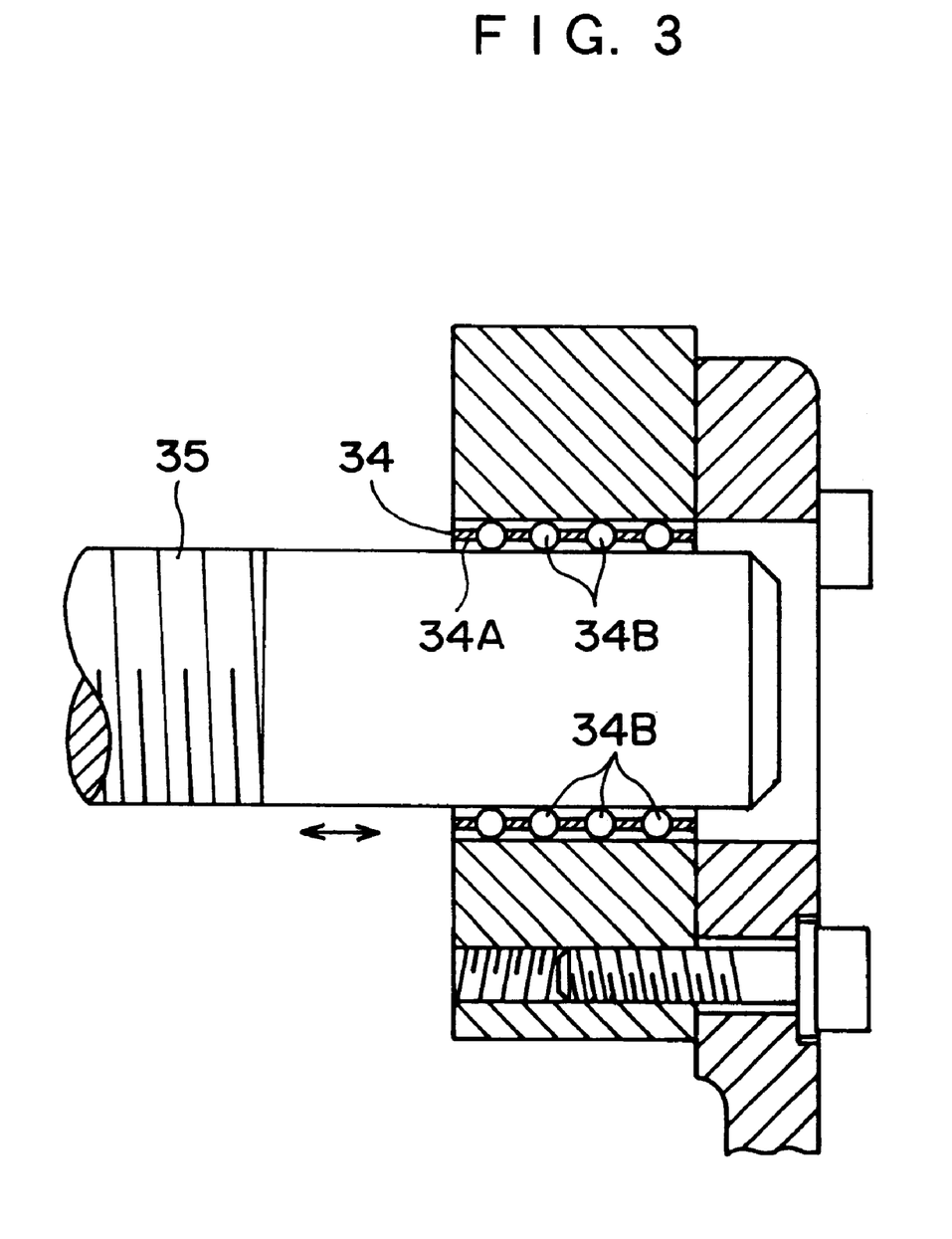
FIG. 3 is a cross section showing a support mechanism for supporting an end of a ball screw axis of the driving system of the Y-axis moving mechanism shown in FIG. 2.

Accordingly, an end of the ball screw axis 35 is supported by a the guide member 31 through the bearing 33 and the other end of the ball screw axis 35 is supported by the guide member 31 through the thrust bearing 34 for slidably retaining the other end of the ball screw axis 35 in axial direction. In other words, as shown in FIG. 3, the other end of the ball screw axis 35 is supported by the guide member 31 rotatably and slidably in the axial direction by the thrust bearing 34, in which a plurality of ball 34B is rotatably buried on inner wall of a cylindrical retainer 34A.

According to the above arrangement, even when the expansion amount of the ball screw axis 35 and the guide member 31 differ on account of temperature change, since the ball screw axis 35 slides in the axial direction thereof, the problem of flexure is not caused to any one of the members.

Figure 4:
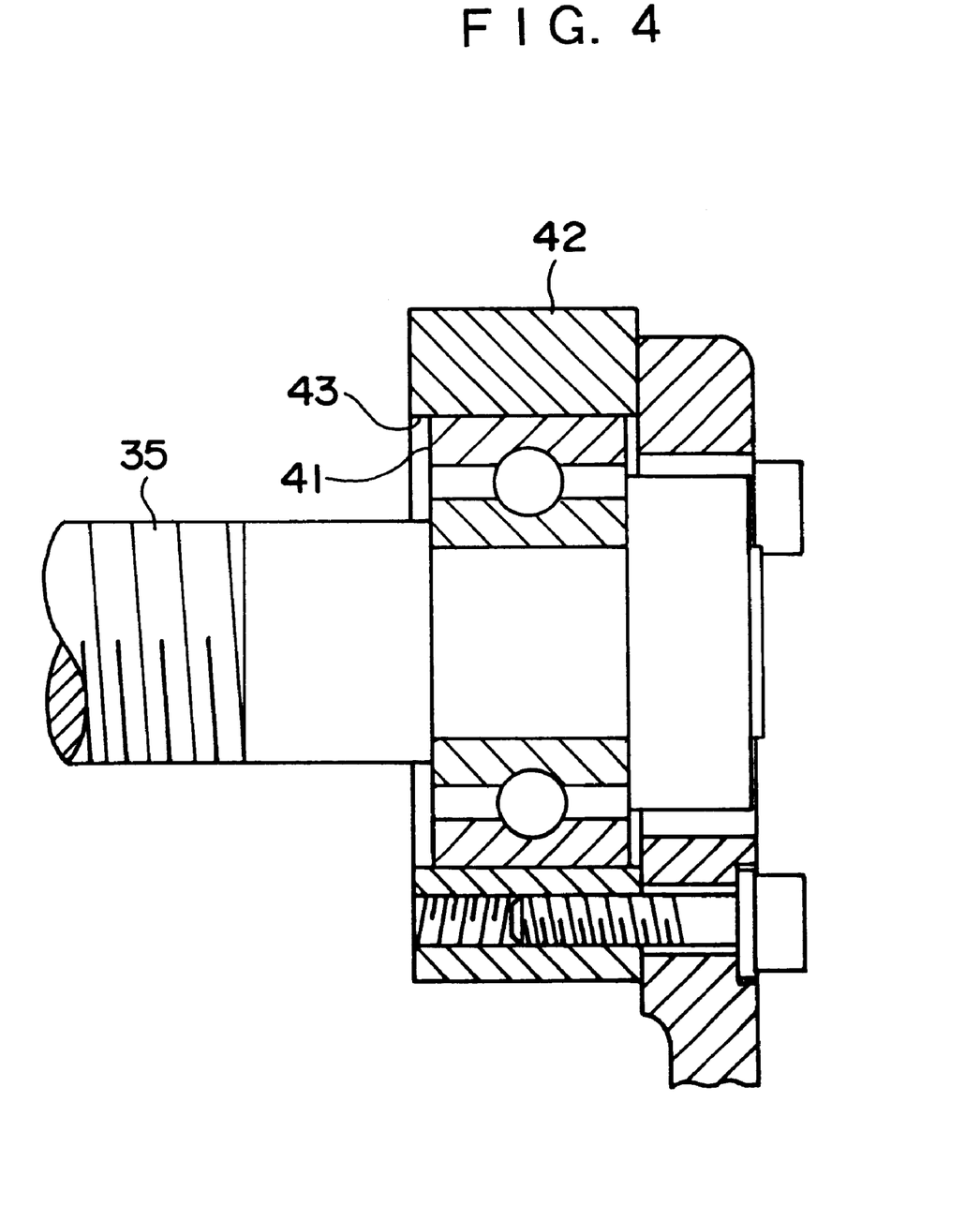
FIG. 4 is a cross section showing another example of the support mechanism for supporting an end of the ball screw axis shown in FIG. 2.

In the above, similar effect can be expected according to another arrangement shown in FIG. 4, in which a ball bearing 41 is fitted to an end of the ball screw axis 35 and the ball bearing 41 is fitted to a hole 43 formed on a bearing support 42 in "loose fit". More specifically, the ball bearing 41 is fitted to the hole 43 with a slight gap (e.g. clearance of approximately 5 $\mu$m) between outer circumference of the ball bearing 41 and inner circumference of the hole 43 of the bearing support 42.

[Measure Against Z-axis Moving Mechanism]

Figure 5:
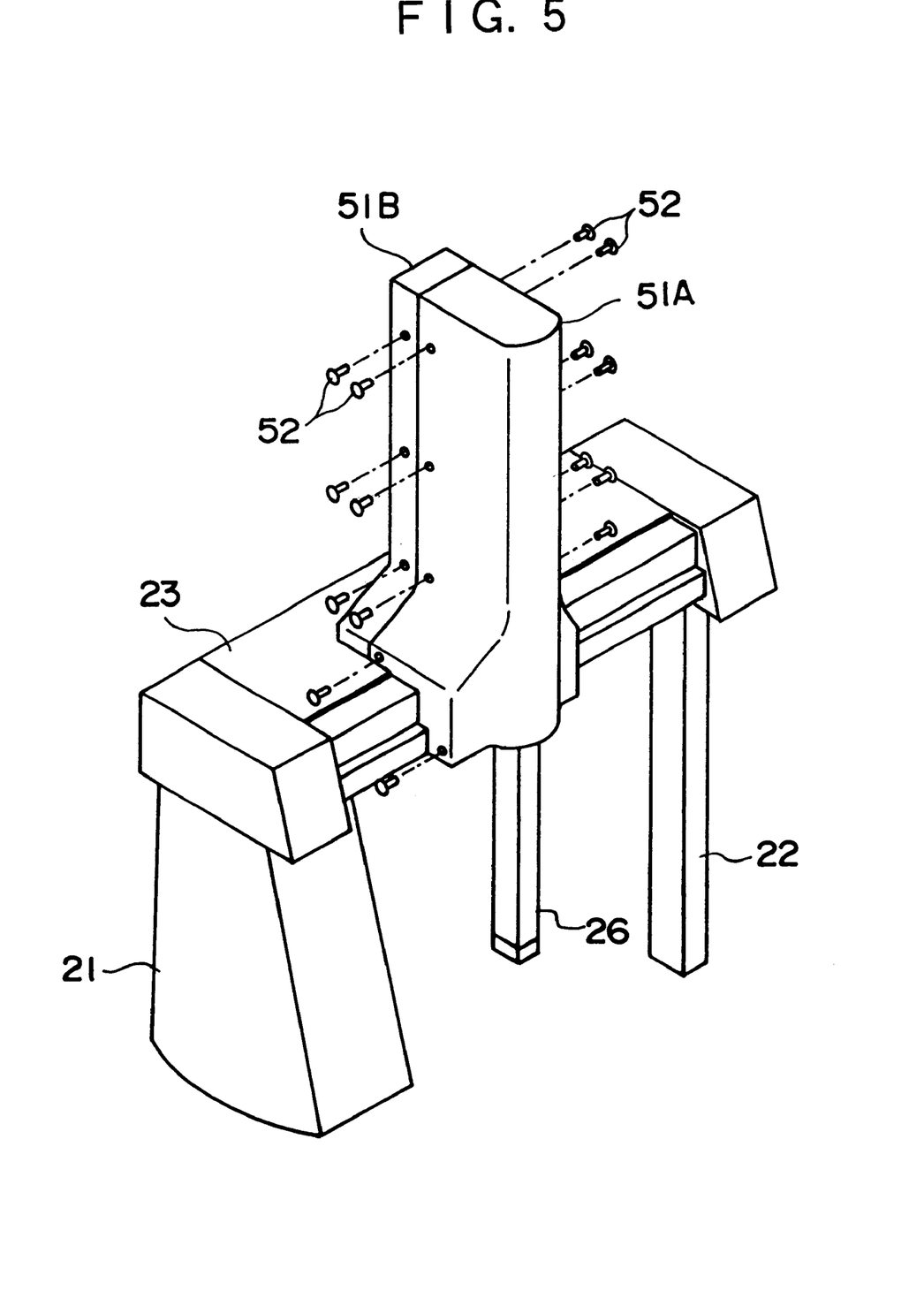
FIG. 5 is a perspective view showing a part of the moving mechanism in the aforesaid embodiment.
Figure 6:
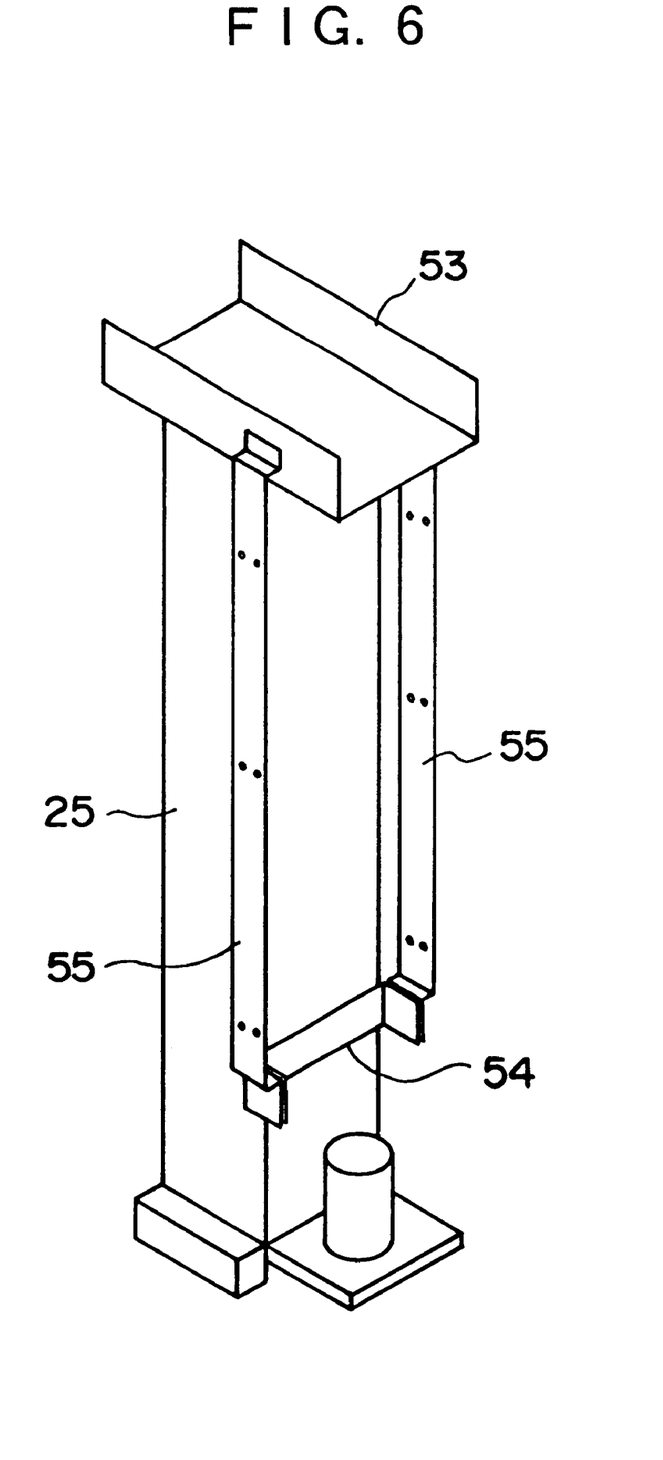
FIG. 6 is a perspective view showing inner structure of FIG. 5.

As shown in FIG. 5, the Z-axis moving mechanism has a Z-cover 51A and 51B for covering the Z-axis structure 25, which are fixed to the Z-axis structure 25 by a bolt 52. More specifically, as shown in FIG. 6, brackets 53 and 54 are fixed on upper and lower portion of the Z-axis structure 25, two cover attachment plates 55 are oppositely fixed between the upper and the lower brackets 53 and 54, and the Z-covers 51A and 51B are fixed by the bolt 52 to the two cover attachment plates 55. In other words, the cover attachment plate 55 is attached to the Z-axis structure 25 as the main structural member of the Z-axis moving mechanism through the brackets 53 and 54.

The Z-axis structure 25 as the main structural member of the Z-axis moving mechanism is made of aluminum or aluminum alloy having aluminum as main component, which have large thermal conductivity and the cover attachment plate 55 attached to the Z-axis structure 25 through the brackets 53 and 54 is made of material other than aluminum or aluminum alloy having aluminum as main component. In this case, since the materials having different thermal expansion rate are mutually attached, there is also a problem of flexure caused to either one of the members in accordance with temperature change.

Figure 7:
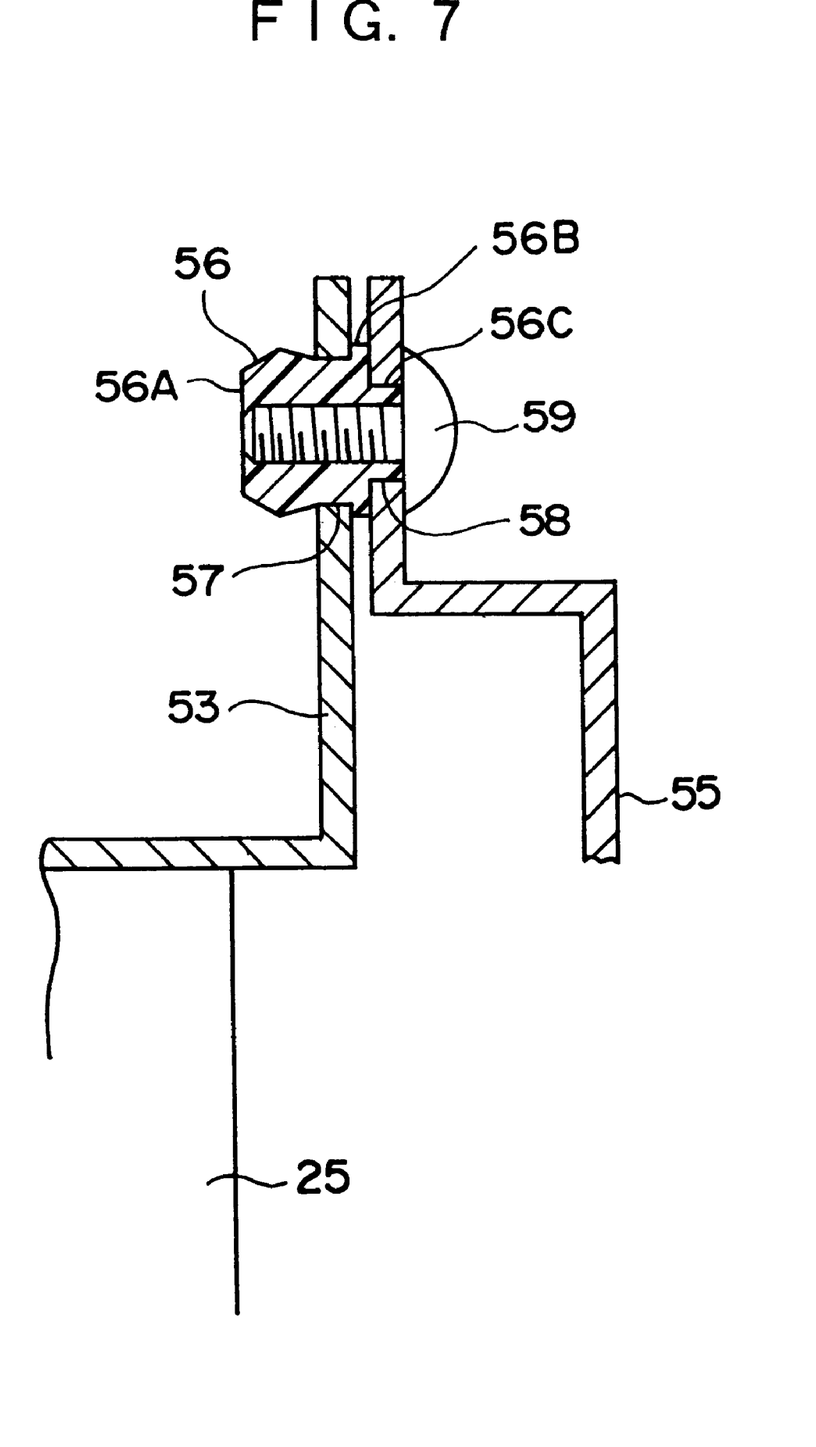
FIG. 7 is a partial cross section of FIG. 6.

Accordingly, as shown in FIG. 7, an elastic member 56 such as rubber is disposed to attachment portion of the Z-axis structure 25 and the cover attachment plate 55, more specifically attachment portion of the brackets 53 and 54 attached to the Z-axis structure 25 and the cover attachment plate 55.

Specifically, a hole 57 is formed on the bracket 53 (54) attached to the Z-axis structure 25 and a distal large diameter portion 56A of the elastic member 56 is retained in the hole 57. On the other end of the elastic member 56, a large diameter portion 56B and a small diameter portion 56C are formed. After fitting the small diameter portion 56C to a hole 58 formed on the cover attachment plate 55 with the large diameter portion 56B sandwiched therebetween, the bracket 53 attached to the Z-axis structure 25 and the cover attachment plate 55 are fixed with the elastic member 56 sandwiched therebetween by screwing a bolt 59 to the elastic member 56 from a side of the cover attachment plate 55.

According to the above arrangement, even when the expansion amount of the Z-axis structure 25 and the expansion amount of the cover attachment plate 55 cause difference on account of temperature change, since the difference can be absorbed by the elastic deformation of the elastic member 56, the problem of flexure caused to either one of the members can be solved.

Figure 8:
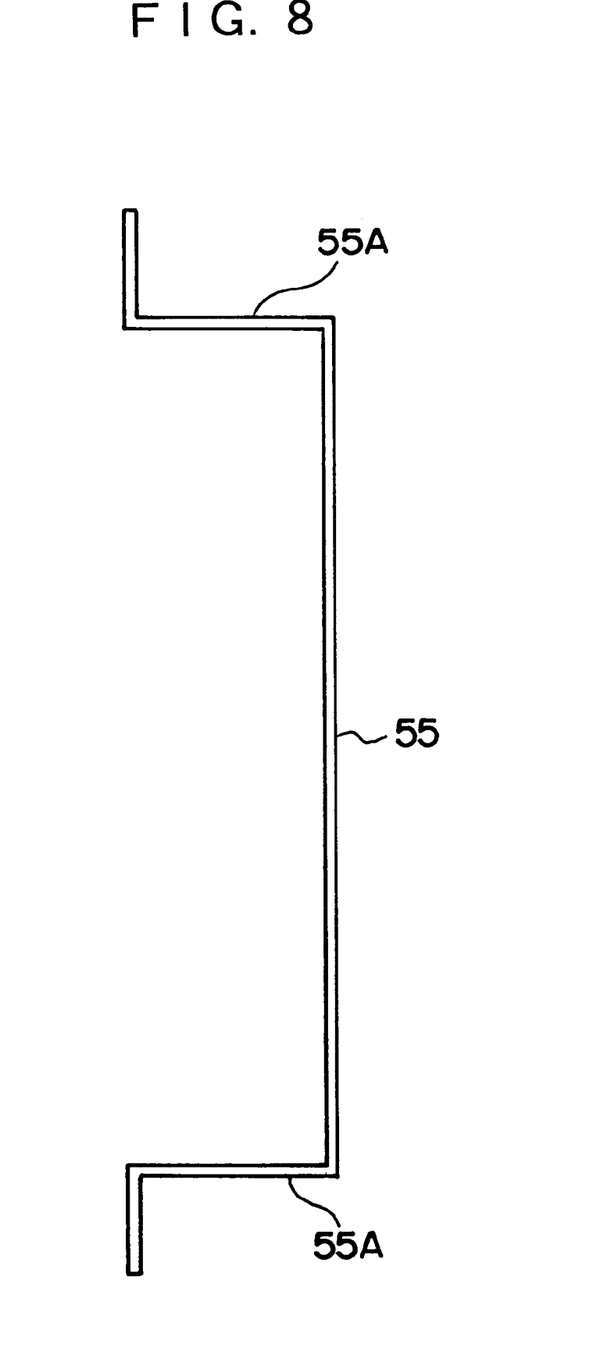
FIG. 8 is an illustration showing another example of FIG. 6.

In the above, similar effect can be obtained by forming an arm portion 55A of the cover attachment plate 55 to facilitate the elastic deformation, as shown in FIG. 8. In other words, low-rigidity portion (a portion easy to be elastically deformed) may be formed to a part of the member attached to the main structural member to facilitate elastic deformation to obtain the similar effect. Specifically, the thickness to be elastically deformed may be locally decreased, or small holes may be linearly arranged.

[Measure Against Temperature on Base]

Figure 9:
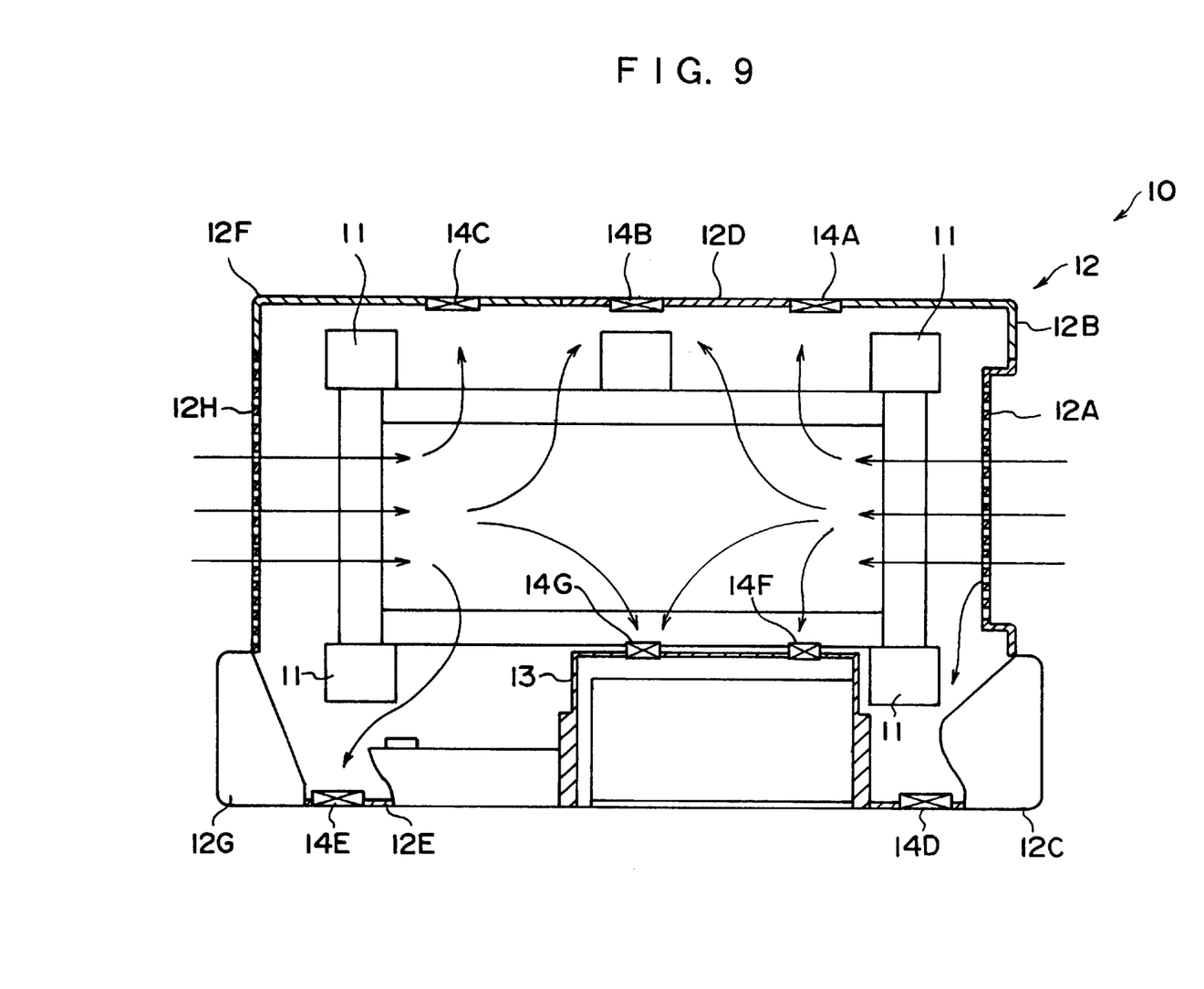
FIG. 9 is a cross section of a base in the aforesaid embodiment.

As shown in FIG. 9, the base 10 has a leg 11 having a table 11A on an upper surface thereof (see FIG. 1) and a leg cover 12 covering periphery of the leg 11.

Figure 10:
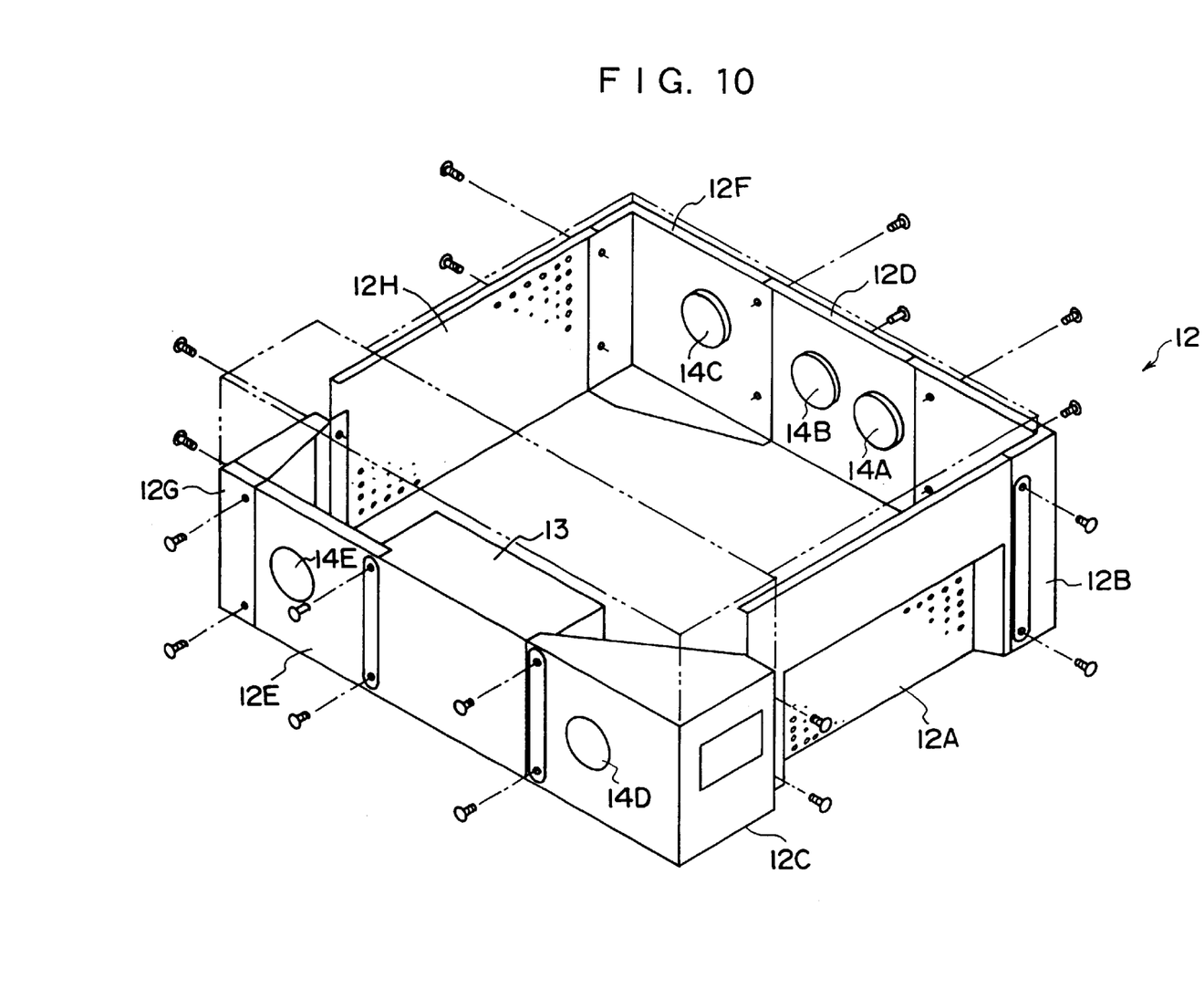
FIG. 10 is perspective view showing a leg cover shown in FIG. 9.

As shown in FIG. 10, the leg cover 12 is formed in rectangular frame configuration by plural cover members 12A to 12H. More specifically, the leg cover 12 is made of a front cover member 12A, a right front cover member 12B, a left front cover member 12C, a right side cover member 12D, a left side cover member 12D, a left side cover member 12E, a right rear cover member 12F, a left rear cover member 12G and a rear cover member 12H.

The front cover member 12A and the rear cover member 12H of the cover members 12A to 12H are formed of punching metal (perforated metal). Further, an accommodating portion 13 for accommodating the controller 60 is formed on a side thereof and surrounding wall of the covering members has a plurality of fan 14A to 14G respectively provided at a predetermined interval.

Accordingly, when the fans 14A to 14G are actuated, the air is inhaled from the holes of the front cover member 12A and the rear cover member 12H into the leg cover 12 and is exhausted to the outside of the leg cover 12 through the fans 14A to 14G, thereby making the temperature distribution uniform inside the base. Accordingly, the geometrical accuracy in accordance with the temperature change can be guaranteed.

[Measure Against Temperature of Controller]

Figure 11:
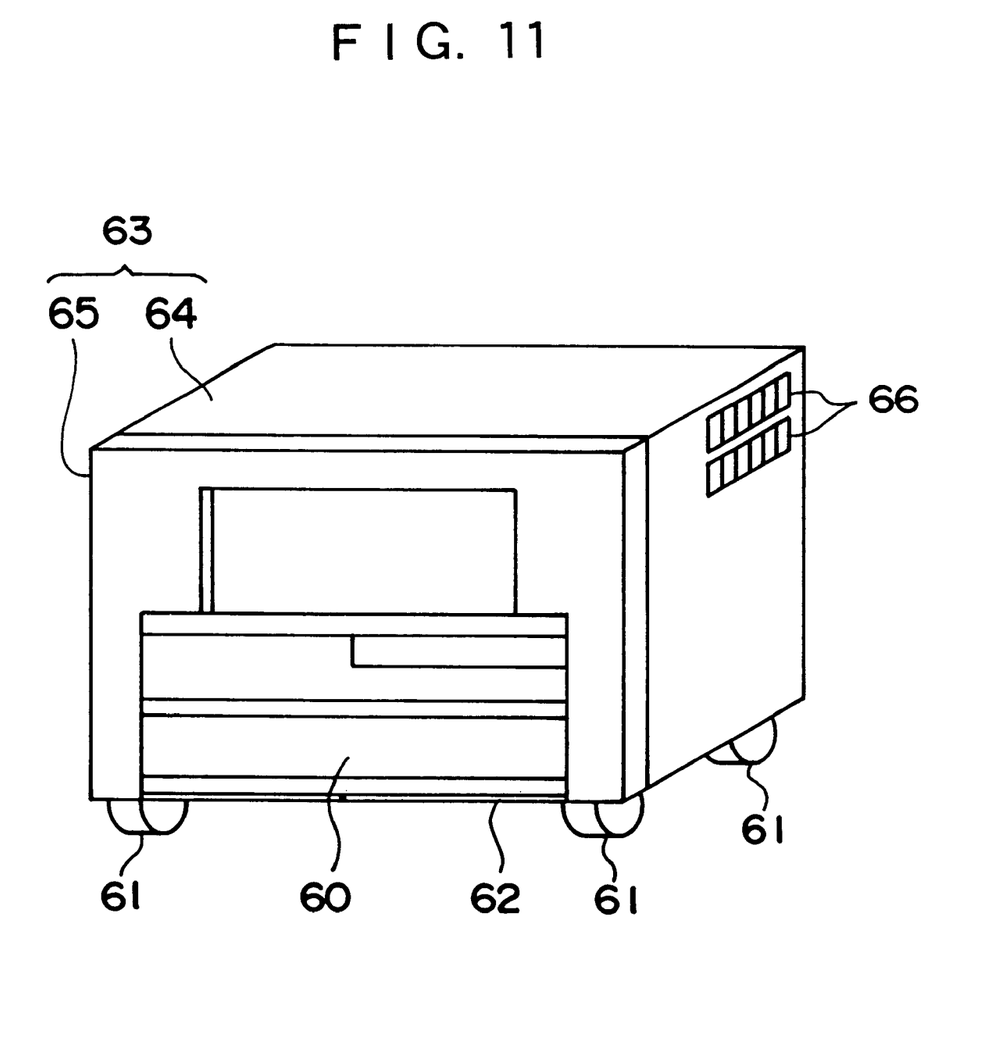
FIG. 11 is a perspective view showing a controller according to the aforesaid embodiment.
Figure 12:
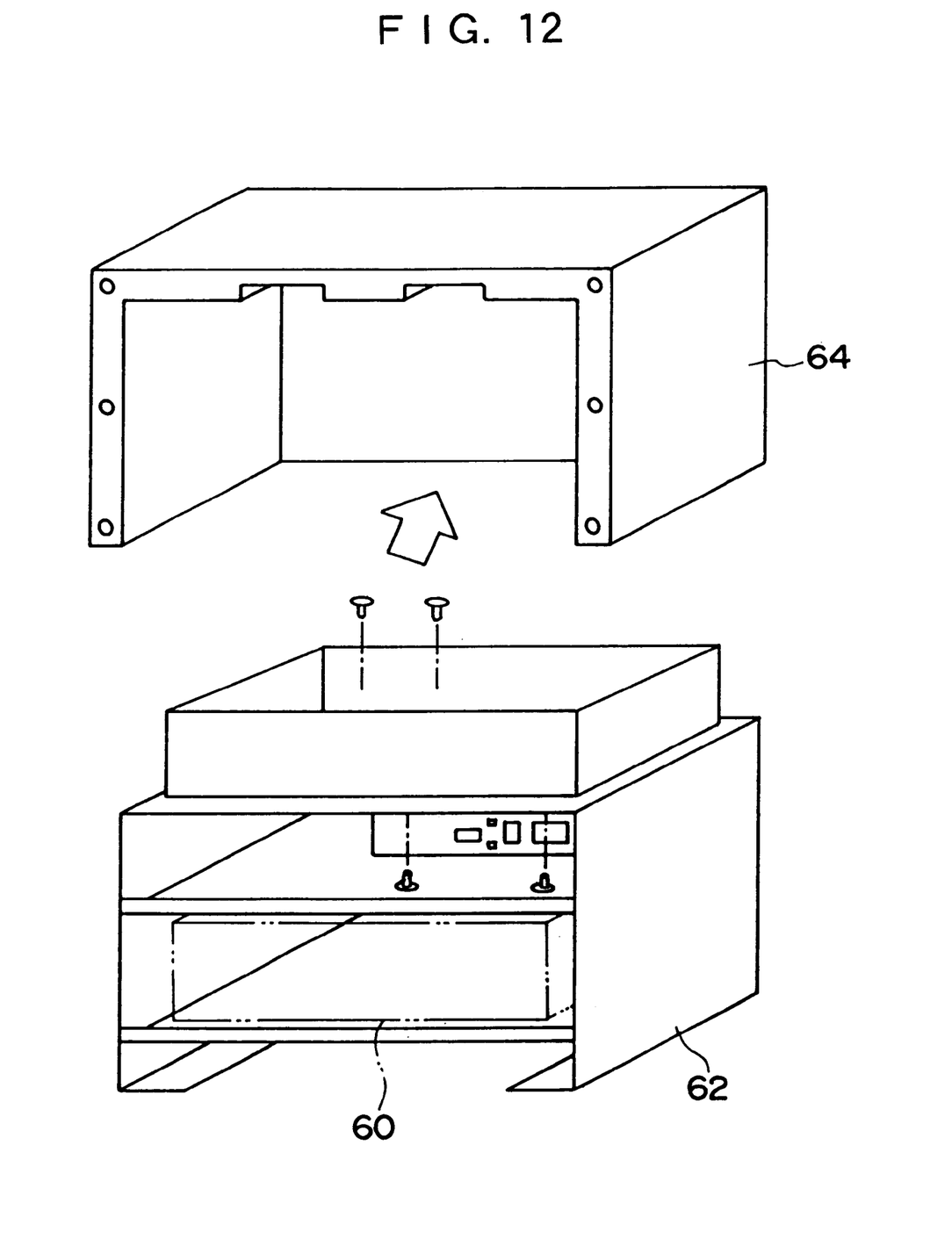
FIG. 12 is an exploded perspective view showing the controller according to the aforesaid embodiment.

As shown in FIGS. 11 and 12, the controller 60 is accommodated in a rack 62 having a caster 61. An outside of the rack 62 is covered by a thermal insulating cover 63. The thermal insulating cover 63 has a main cover 64 covering all sides of the rack 62 except for a front and bottom side thereof, and an auxiliary cover 65 covering the front side of the rack 62. A fan 66 for discharging the heat inside the cover 63 is provided on a side of the thermal insulating cover 63.

Accordingly, since the heat from the controller 60 is blocked by the thermal insulating cover 63 and is discharged to the outside by the fan 66, bad influence by the heat can be restrained to the utmost, thereby guaranteeing the geometrical accuracy during the temperature change.

Though a three-dimensional measuring machine is described in the aforesaid embodiment, the present invention can be applied to the other measuring instrument such as two-dimensional measuring machine as long as the touch signal probe P is movable relative to the base 10. Superior effect can be obtained by applying the present invention if mechanical change is caused by the temperature change.

As the probe for the three-dimensional measuring machine, the touch signal probe P is not only to be used but a non-contact type probe may also be used.

What is claimed is:

1. A measuring machine comprising:
   a base;
   a probe;
   a moving mechanism for relatively moving the base and the probe, the moving mechanism having a main structural member made of at least one of aluminum and an aluminum alloy including aluminum as a main component; and
   a member attached to the main structural member of the moving mechanism, wherein said member attached to the main structural member of the moving mechanism is made of a material other than the at least one of the aluminum and the aluminum alloy having aluminum as the main component, wherein an elastic member is inserted into an attachment portion of the main structural member and the member attached to the main structural member.

2. The measuring machine according to claim 1, the moving mechanism comprising:
   a first moving mechanism for linearly moving the probe;
   a second moving mechanism for moving the probe in a direction orthogonal with the moving direction of the first moving mechanism; and
   a third moving mechanism for moving the probe in a direction orthogonal with the moving direction of the first moving mechanism and the second moving mechanism.

3. The measuring machine according to claim 2, wherein at least one of the first, the second and the third moving mechanisms has a guide member fixed along the moving direction thereof, a slider movably provided to the guide member, a feed screw axis, having two ends, disposed on the guide member along the moving direction of the slider and having said two ends fixed to the guide member, and a nut member screwed to the feed screw axis for moving the slider in a longitudinal direction of the feed screw axis by a rotation of the feed screw axis,
   the guide member formed of the at least one of the aluminum or the aluminum alloy having aluminum as the main component, and
   the feed screw axis formed of steel and having an end portion supported to be slidable in an axial direction thereof.

4. A measuring machine comprising:
   a base;
   a probe;
   a moving mechanism for relatively moving the base and the probe, the moving mechanism having a main structural member made of at least one of aluminum and an aluminum alloy including aluminum as a main component; and
   a member attached to the main structural member of the moving mechanism, wherein said member attached to the main structural member of the moving mechanism is made of a material other than the at least one of the aluminum and the aluminum alloy having aluminum as the main component, and has an easily elastically deforming portion.

5. The measuring machine according to claim 4, the moving mechanism comprising:
   a first moving mechanism for linearly moving the probe;
   a second moving mechanism for moving the probe in a direction orthogonal with the moving direction of the first moving mechanism; and
   a third moving mechanism for moving the probe in a direction orthogonal with the moving direction of the first moving mechanism and the second moving mechanism.

6. The measuring machine according to claim 5, wherein at least one of the first, the second and the third moving mechanisms has a guide member fixed along the moving direction thereof, a slider movably provided to the guide member, a feed screw axis, having two ends, disposed on the guide member along the moving direction of the slider and having said two ends fixed to the guide member, and a nut member screwed to the feed screw axis for moving the slider in a longitudinal direction of the feed screw axis by a rotation of the feed screw axis,
   the guide member formed of the at least one of the aluminum or the aluminum alloy having aluminum as the main component, and
   the feed screw axis formed of steel and having an end portion supported to be slidable in an axial direction thereof.

* * * * *